United States Patent [19]

Hall

[11] 4,209,177
[45] Jun. 24, 1980

[54] EXHAUST SEAL RING

[75] Inventor: John F. Hall, Bloomfield Hills, Mich.

[73] Assignee: Chrysler Corporation, Highland Park, Mich.

[21] Appl. No.: 3,683

[22] Filed: Jan. 15, 1979

[51] Int. Cl.² ............................................. F16J 15/12
[52] U.S. Cl. .................................... 277/101; 277/230; 285/363; 285/368
[58] Field of Search .............. 285/363, 368, 405, 412, 285/DIG. 18; 277/105, 101, 106, 12, 30, 47, 48, 102, 230, 236, DIG. 6

[56] References Cited

U.S. PATENT DOCUMENTS

| | | | |
|---|---|---|---|
| 1,703,725 | 2/1929 | Cromwell | 285/363 |
| 1,924,657 | 8/1933 | Saine et al. | 285/363 X |
| 2,376,039 | 5/1945 | Driscoll et al. | 277/230 X |
| 2,761,203 | 9/1956 | De Witt | 277/230 X |
| 2,882,082 | 4/1959 | Poltorak et al. | 277/230 X |
| 2,924,471 | 2/1960 | Poltorak et al. | 277/230 X |
| 2,957,717 | 10/1960 | Bram | 277/101 X |
| 3,004,780 | 10/1961 | Main | 285/368 X |
| 3,275,346 | 9/1966 | Gregg | 285/363 X |
| 4,014,557 | 3/1977 | Bragg | 277/230 |
| 4,097,071 | 6/1978 | Crawford et al. | 285/363 X |

Primary Examiner—Robert S. Ward, Jr.
Attorney, Agent, or Firm—Baldwin & Newtson

[57] ABSTRACT

The outlet of an exhaust manifold for a transversely mounted vehicle engine is coupled by an articulated connection with the inlet of an exhaust header. The articulated connection has portions associated with the manifold and header respectively and includes an annular seal ring with a spherical sealing surface thereon. The sealing surface engages a conical seating surface on the manifold at the urging of a spring between the manifold and header. The seal ring is composed of many metal wires which are packed together to define the annular structure and thus produce a wear resistant, relatively impervious sealing surface having a slight resiliency to permit good sealing conformation against an imperfectly formed geometric seating surface.

5 Claims, 8 Drawing Figures

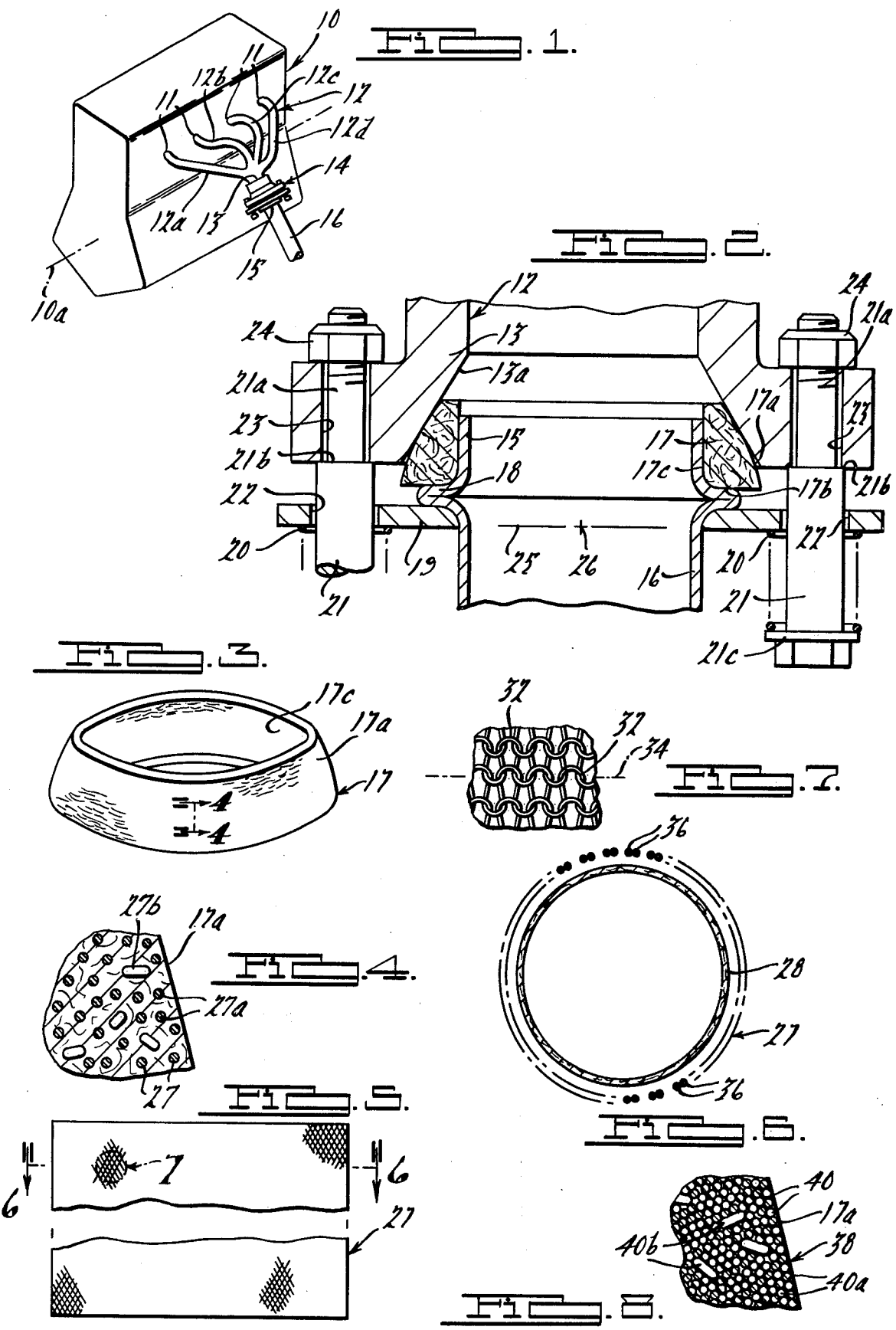

EXHAUST SEAL RING

BACKGROUND AND OBJECTS OF THE INVENTION

This application relates specifically to the previously filed application Ser. No. 857,488 which was filed Dec. 5, 1977 and which concerned itself generally with the configuration of an articulated connection in an exhaust system. The subject application relates to the specific structure and resultant characteristics of a particular improved seal ring for such an articulated connection.

Articulated connections of the type disclosed herein require a good contact between a sealing member and a seat member. The sealing member and the seat member are subject to relative rotational movement therebetween particularly caused by rolling action of a transversely mounted engine. The sealing member is also subject to a considerable amount of abrasive rubbing. It is desirable that the sealing member have a sufficient resistance to wear over the life of the vehicle engine and exhaust system and the seal should possess good high temperature strength and stability.

An object of the invention is to provide an improved articulated connection between an exhaust manifold and an exhaust header or tailpipe which utilizes a sealing annulus of packed or compressed wire construction, the closely extending strands of wire producing a seal with a sufficiently continuous sealing surface characterized by good wearability, high temperature resistance, stability and a slight resiliency for conformation to imperfect geometric surfaces.

Another object is to provide an annular seal ring wherein a spherical sealing surface is formed by compressive molding or packing of a number of wires having a relatively small diameter compared to the size of the seal ring and of a material of sufficient hardness and high temperature durability to produce a sufficiently continuous sealing surface for exhaust gases.

Other objects and features of this invention will be more readily understood and appreciated after a reading of the following detailed description, reference being had to the accompanying drawings which form a part of the specification and which illustrate preferred embodiments of the invention.

IN THE DRAWINGS

FIG. 1 is a diagramatic view of a 4-cylinder automobile engine oriented with its roll axis transverse to the longitudinal or fore and aft direction of the exhaust system and vehicle.

FIG. 2 is an enlarged sectioned view of the articulated connection between the exhaust manifold and the exhaust header as found in FIG. 1.

FIG. 3 is a perspective view of the annular sealing ring shown in FIG. 2.

FIG. 4 is an enlarged sectioned view of the sealing ring taken along section line 4—4 in FIG. 3 and looking in the direction of the arrows.

FIG. 5 is an elevational view of a cylindrically shaped quantity of woven wire fabric prior to compressing it to the configuration of the subject seal shown in FIG. 3.

FIG. 6 is a sectioned view of the cylindrical woven wire member shown in FIG. 5 taken along section line 6—6 and looking in the direction of the arrows.

FIG. 7 is an enlarged fragmentary view of the woven wire fabric within the encircled portion labeled 7 in FIG. 5.

FIG. 8 is an enlarged sectioned view of another embodiment of the sealing ring similar to the view shown in FIG. 4.

In FIG. 1 of the drawings, a 4-cylinder automobile engine 10 is illustrated with a roll axis 10a extending substantially parallel to the crankshaft (not visible in FIG. 1). The roll axis 10a of engine 10 is adapted to extend substantially normal to the exhaust system and the longitudinal fore and aft axis of the vehicle in which the engine is transversely mounted. This transverse orientation is advantageous particularly for smaller sized vehicles and is utilized in combination with a transaxle connected to the front wheels.

Engine 10 has an exhaust system associated therewith including an engine manifold 12 which receives exhaust gases through exhaust ports 11. Four short manifold conduits 12a, 12b, 12c and 12d extend between the ports 11 and an outlet portion 13 of the manifold 12. The four conduits 12a–12d merge at the outlet portion 13 which is suitably connected by means of an articulated coupling 14 with the inlet 15 of an exhaust header 16.

The outlet 13 of the manifold is best shown in FIG. 2 and is defined by an annular, conically shaped surface 13a which diverges in the downstream direction with respect to exhaust gas flow. A sealing annulus or exhaust sealing ring 17 includes a spherical sealing surface 17a which engages the conical seating surface 13a. It also has an annular transversely extending sealing surface 17b seated against the proximate surface of an annular movement limiting portion 18 of the header 16 adjacent to its butt end 15. The flange 18 extends radially outward from the header 16 and transversely to the latter's major axis. The interior surface 17c of the annulus 17 is cylindrical and coaxial with the axis of header 16, which axis is substantially perpendicular to the roll axis 10a of the engine 10. The surface 17c fits coaxially and snugly around end 15 of the header 16.

A clamping collar 19 is yieldably urged against the side of flange 18 furthest from the end 15 by means of a pair of diametrically arranged springs 20 which are held in clamping position by shoulder bolts 21. Each of the bolts 21 extends through a bolt hole 22 in the collar 19, and has a screw threaded end 21a of reduced diameter which extends through a hole 23 in the manifold 12 and is secured in position by a nut 24, and has an annular shoulder 21b that seats against the manifold 12. A flange or enlargement 21c provides a retainer for the spring 20 to urge the latter against the collar 19.

By the construction described, shoulder 21b affects a predetermined spacing between the flange 21c and manifold 12 and accordingly maintains a predetermined spring induced compression force clamping the collar 19 against the flange 18. Resultantly, the sealing surfaces 17a and 17b are clamped respectively between the surface 13 and the upper transverse surface of the flange 18 to maintain a gas sealing relationship therebetween. The major axes of the spring 20 at their regions of contact with collar 19 intersect a line 25 parallel to the roll axis 10a of engine 10 and through the center of curvature 26 of the spherical surface 17a. Thus, with rolling movement of engine 10 about its roll axis 10a, the movement of the clamped header 16, annulus 17, and collar 19 with respect to the manifold 12 takes place between the surface 13 and spherical surface 17a about a pivot axis comprising the latter line 25 through the center 26. The resultant flexing and alternate compressing and tensioning of the springs 20 is reduced to a minimum.

The manifold 12 may comprise a sand casting while the header 16 may comprise tubular steel stock. The annulus 17 in the preferred embodiment is formed from a quantity of woven steel wire or mesh packed or compressed into the configuration of the annular sealing ring shown in FIGS. 2 and 3. In FIGS. 5 and 6, a cylindrically shaped woven wire mesh 27 is illustrated. Also a cylindrically shaped filler member 30 is shown although in one embodiment it is eliminated. Desirable materials for member 30 may be asbestos or bonded mica sheet. Material specification will be found hereinafter in the examples. The woven steel wire, the asbestos sheet or yarn and the bonded mica are commercially available materials.

FIG. 3 is a perspective view of one embodiment and reveals the packed wire structure thereof. FIG. 4 is a fragmentary enlarged sectioned view revealing the closely packed wire portions 27 with filler material 30 therebetween. Note that most of the wire portions 28a extend in the circumferential direction normal to the plane of the paper while some portions 28b extend otherwise. This is a desirable characteristic and promotes a relatively continuous surface for sealing properties.

The cylindrically or tubularly shaped wire mesh 27 which is shown in FIG. 5 may be of any metal but stainless steel is desirable in this instance. Of course other high temperature strength metals may be used. In FIG. 7, the structure of the woven wire fabric is revealed. Single wire strands 32 are illustrated but multiple strands are also useful and available. The sectioned view of the woven cloth in FIG. 6 shows a section taken through the loop portion along line 34 in FIG. 6. Hence the pairs of adjacent wire ends 36 in FIG. 6 are shown.

In FIG. 8, another embodiment of the seal ring 38 is shown which eliminates the filler material as in FIG. 4. Here the wire portions 40 are more closely packed to produce an almost continuous seal surface. As shown in FIG. 4, the greatest amount of wire portions 40a extend circumferentially (normal to the plane of the paper) but the remainder 40b are otherwise.

The following three embodiments of annular seal rings are discussed by way of examples only. other examples within the scope of this invention are probable.

In one embodiment woven or knitted wire mesh of stainless type steel is used. The wire mesh is woven from three strands of wire each having a diameter of about 0.279 millimeters (0.011 inches). The filler material is single strand grade AAAA asbestos yarn. No organic binders or other foreign materials are present. A desirable wire material is AISI type 309 stainless steel (SAE 30309). This steel has high temperature and heat resisting characteristics. It is ductile, machinable and readily welded and exhibits good oxidation resistance up to 1800° F. The material is non-magnetic when annealed but may become slightly magnetic when cold worked. The chemical composition is as follows:

Carbon—maximum 0.20%
Maganese—maximum 2.00%
Silicon—maximum 1.00%
Phosphorous—maximum 0.04%
Sulfur—maximum 0.03%
Chromium—22.00 to 24.00%
Nickel—12.00 to 15.00%
Iron—Remainder This steel has a density of 0.29 pounds per cubic inch and its average coefficient of thermal expansion per degree Farenheit is $8.0 \times 10^{-6}$. It has an annealed ultimate tensile strength of about 90,000 psi and a yield strength at 0.2% offset of 40,000 psi.

The Rockwell hardness of the material is about B-80. The steel wire and asbestos yarn are furnished in proportions so as to provide a mixture of about 85% of the total mass being stainless steel and the remainder being asbestos. The wire mesh and asbestos are compressed to a density of 0.15 pounds per cubic inch (4.1 grams per cubic centimeter).

In a second embodiment, the specifics for the stainless steel wire found in the first embodiment are applicable to this example. In place of asbestos yarn as a filler, a bonded mica sheet is utilized. The sheet consists mostly of phlogopite mica having a typical analysis of $H_2KMgAl(SiO_4)_3$. The mica material is bonded with no more than 15% silicon resin binder by weight. The weight loss after ignition at 850° C. (1560° F.) for two hours is no more than 7.5%. The mica sheet has an average thickness of about 0.038 centimeters (0.015 inch) as measured according to ASTM D374, Method C and has an approximate weight of 9.64 kilograms per square meter (0.13 pounds per square foot). The sheet has enough flexibility to allow it to be wound around a one inch diameter mandrel without breaking or tearing. The composite sealing ring has a mass of about 85% stainless steel and 15% mica dispersed in a relatively homogeneous matrix.

In a third embodiment which has shown promise, no filler material is utilized. The stainless steel utilized may be either AISI 309 or 316. Wire having a diameter of 0.009 inches and woven with a three strand configuration. The open wire structure is packed by application of compressive forces to produce a composite seal ring with a composition of between about 80–90% wire material.

Although specific details and examples have been provided, it is to be understood that this invention as specified in the claims is not limited thereby and modifications are contemplated which still fall within the inventive scope. Specifically, it is contemplated that the manifold may be of tubular metal material instead of cast iron, the seating surface may have a configuration other than conical, the seal surface may have a configuration other than spherical, the header may be other than a tubular metal member, the clamping force may be provided by other means than the compression springs and shoulder bolts and the annular seal ring may be formed from bulk wire rather than from woven wire fabric.

I claim:

1. An improved sealing annulus for use in an articulated ball type connection of a vehicle exhaust system between an exhaust manifold means for conducting exhaust gas from a vehicle engine and an exhaust header for conducting exhaust gas from the manifold to the atmosphere, one of the members having a seal seating surface defined thereby including an annular interior surface, the other member carrying the sealing annulus which has a sealing surface adapted to engage the annular interior surface of the one member as the members are urged toward one another parallel to the direction of exhaust gas flow, the improved annulus comprising: a member composed of a plurality of separate wires each having a relatively small diameter as compared to the dimensions of the annulus and compact molded into a ring-like configuration of sufficient density and structural rigidity to prohibit any substantial movement of the members toward each other subsequent to initial engagement so as to preserve spacing necessary for any significant angulation therebetween, the annulus having a sealing surface defined by closely packed wire portions extending along the exterior surface thereof whereby the annulus displays good thermal stability with high temperature compatability and slight resiliency to conform to imperfect seat surfaces.

2. An improved sealing annulus for use in an articulated ball type connection between first and second exhaust gas passage members, one of the members having a seal seating portion formed at one end including an interior annular surface, the other member carrying the seal annulus at one end thus presenting a seal surface adapted to engage the annular seating surface as the corresponding ends of the members are urged axially toward one another, the improved annulus comprising: a composite annularly shaped member compact molded from a plurality of small diameter wire portions and a filler material so formed to be of sufficient density and structural rigidity to prohibit any substantial axial movement between the members subsequent to initial engagement of the seal surface with the seal seating surface so as to preserve spacing necessary for desired angulation therebetween, the filler material being more readily modable than the wire and exhibiting high temperature resistance so as to be deformed between and about the wire portions to thereby form a fluid impervious mass.

3. The improved seal annulus of claim 2 in which the mass composition is about 85% wire and 15% filler.

4. The improved sealing annulus as set forth in claim 2 and utilizing asbestos as filler material and molded so that the density of the composite annulus of wire and filler is about one-half of the density of the wire by itself.

5. The improved sealing annulus as set forth in claim 2 in which the filler material is mica sheet bonded together by no more than about 15% silicon resin by weight.

* * * * *